US008606467B2

(12) United States Patent
Gehin

(10) Patent No.: US 8,606,467 B2
(45) Date of Patent: Dec. 10, 2013

(54) SECURE METHOD FOR AUTOMATICALLY CLOSING A MOTOR VEHICLE TAILGATE

(75) Inventor: Frédéric Gehin, Creteil Cedex (FR)

(73) Assignee: Valeo Securite Habitacle, Creteil (FR)

( * ) Notice: Subject to any disclaimer, the term of this patent is extended or adjusted under 35 U.S.C. 154(b) by 611 days.

(21) Appl. No.: 12/665,400

(22) PCT Filed: Jun. 25, 2008

(86) PCT No.: PCT/EP2008/058094
§ 371 (c)(1),
(2), (4) Date: Jun. 16, 2010

(87) PCT Pub. No.: WO2009/000861
PCT Pub. Date: Dec. 31, 2008

(65) Prior Publication Data
US 2010/0256875 A1    Oct. 7, 2010

(30) Foreign Application Priority Data
Jun. 25, 2007    (FR) ...................... 07 04549

(51) Int. Cl.
*B60R 22/00*    (2006.01)
*B60Q 1/00*    (2006.01)

(52) U.S. Cl.
USPC ............................................ 701/49; 340/436

(58) Field of Classification Search
USPC ............ 701/49; 250/559.4, 221, 341.1; 340/989, 426.16, 426.29, 435, 436, 340/3.63, 5.72, 5.2; 296/76, FOR. 116, 139, 296/37.16; 49/339, 340
See application file for complete search history.

(56) References Cited

U.S. PATENT DOCUMENTS

| 7,248,283 B2* | 7/2007 | Takagi et al. ................. 348/118 |
| 2002/0084675 A1 | 7/2002 | Buchanan et al. |
| 2004/0040771 A1* | 3/2004 | Ploucha ........................ 180/271 |
| 2005/0011129 A1 | 1/2005 | Vassy |
| 2006/0103512 A1* | 5/2006 | Fukuda et al. ................. 340/435 |
| 2007/0267238 A1* | 11/2007 | Guy et al. ...................... 180/272 |

FOREIGN PATENT DOCUMENTS

| EP | 0 598 951 A1 | 6/1994 |
| WO | 02/053413 A2 | 7/2002 |
| WO | 03/048492 A1 | 6/2003 |

OTHER PUBLICATIONS

International Search Report w/translation from PCT/EP2008/058094 dated Sep. 1, 2008 (4 pages).

* cited by examiner

*Primary Examiner* — Muhammad Shafi
(74) *Attorney, Agent, or Firm* — Osha Liang LLP

(57) ABSTRACT

The subject of the invention is a secure method for automatically closing a motor vehicle tailgate (200) fitted with at least one presence sensor (201; 202; 203; 204) of an element in a detection zone (206), the said detection zone having at least one shadow zone (207; 208; 209; 210), characterized in that it comprises the step consisting in making the automatic operation of closing the vehicle tailgate conditional upon the completion of the following various operations: —detecting (301) the presence of an element in the detection zone; —detecting (304) a departure of the said element from the detection zone.

15 Claims, 4 Drawing Sheets

SECURE METHOD FOR AUTOMATICALLY CLOSING A MOTOR VEHICLE TAILGATE

BACKGROUND OF THE INVENTION

1. Field of the Invention

The subject of the present invention is a secure method of automatically closing a trunk of a motor vehicle, the trunk being of the tailgate type. The main aim of the invention is to secure, for a motor vehicle user, an operation to close a tailgate of his vehicle, by checking that said user is not in a so-called detection zone, his presence in such a zone having the unfortunate consequence of causing his person to come into contact with the tailgate upon the closure of the latter.

The field of the invention is, generally, that of the so-called motor vehicle user convenience devices, intended to facilitate for a user various interventions that he makes on his vehicle. Among these devices, there are known, for example, central locking devices for the doors and the trunk, devices for electrically closing windows, but also various devices for automatically closing openings, for example doors or trunk. In the case of the doors of some vehicles, there are sliding doors whose closure is controlled by a pressure of the user on a particular button, present for example on an identifier-type device, also likely to be used as a key to start the vehicle, or directly on the vehicle. In the case of the trunks, there is also the possibility of exerting a pressure on a button, more often than not situated at the most accessible end of the trunk when it is in the open position, to provoke the immediate closure of said trunk.

2. Related Art

For example, in the case of tailgate-type trunks, some vehicles have, at the free end of said tailgate, often to the right side of the latter, a control button dedicated to the automatic closure of the tailgate: a pressure by a user, standing under the tailgate, on this dedicated button triggers the immediate closure of the tailgate.

SUMMARY

One problem became rapidly apparent with such devices for which the triggering of the closure operation is immediate: the user is then still under the tailgate when the closure operation begins. He may be frightened by the triggering of the movement, and, in any case, has only very little time to move outside the trajectory of the tailgate when the latter is closing. Some devices provide impact detectors which make it possible to stop the movement of the trunk when the latter comes into contact with an obstacle. However, such devices are unsatisfactory when it comes to user convenience.

In order to provide a response to this problem, it has been proposed, in the state of the art, to use sensors that make it possible to detect the presence of elements, and notably individuals, in a so-called detection zone, defined by the following principle: if the tailgate were closed while an element is placed in the detection zone, an impact between the tailgate and the element concerned would occur. To perform this presence detection, various types of sensors can be used; notably, it is possible to use ultrasound sensors that are positioned at the level of the rear bumper of the vehicle, and that are normally used to perform a parking aid function. Such sensors make it possible to obtain accurate information on the distance between an element that is present behind the vehicle and the rear of the vehicle, and thus determine if it is present in said detection zone. Other sensors can also be used. Notably, it is possible to use systems based on cameras and image processing algorithms to detect the presence of such an element and estimate the distance at which it is located.

However a key problem arises with the different sensors used: in all cases, there is at least one zone, designated shadow zone, that corresponds to a portion of the detection zone in which the presence of an element is not detected. In the case where the sensors used are cameras, the shadow zones correspond to zones situated at the back of the vehicle that are not visible on the image, because, for example, of the orientation of the camera or its viewing angle.

In the case where the sensors used are ultrasound sensors, for example used for the parking aid function, the presence of the shadow zones is due to the following phenomenon, illustrated notably by means of FIGS. 1 and 2.

FIG. 1 diagrammatically represents a first ultrasound sensor 100 used for the parking aid functions. Such a sensor has a mobile membrane 101. In the case of direct detections, that is to say the case where it is the same sensor 100 that emits a wave in a propagation zone 103, and that recovers this wave once reflected by an obstacle, it is the same membrane 101 that is used to emit and to receive the emitted wave. After having excited this membrane to emit the ultrasounds, it takes approximately 1 millisecond for the membrane to stabilize, that is to say for it to become immobile again, and for it to be able once again to react to a possible return wave. Because of the speed of propagation of the ultrasounds in air, close to 330 meters per second, the wave has the time, in one millisecond, to travel 34 centimeters. Consequently, an obstacle situated less than 17 centimeters from the sensor, therefore requiring a travel of 34 centimeters round-trip to start from the membrane and return to the membrane, will not be visible by the sensor concerned, the membrane of the latter not having had the time to stabilize. The zone close to the sensor and not visible to the latter is thus defined as a shadow zone 102.

In addition to the direct detections that have just been detailed, crossed detections have been put in place, in which a first sensor emits a wave, and second sensor recovers the wave reflected by a detected obstacle. Such crossed detections require a good synchronization of all the sensors involved. They make it possible to substantially limit the shadow zones that have just been mentioned, without in any way making them fully disappear.

FIG. 2 shows the zone situated at the back of a vehicle 200; in this figure, the rear bumper 205 of the vehicle is equipped with four ultrasound sensors of the same type as the sensor of FIG. 1, respectively referenced, considering them from left to right, 201, 202, 203 and 204. Each of these sensors has, within a detection zone 206, a shadow zone that is specific to it, respectively referenced 207, 208, 209 and 210.

In a nonlimiting embodiment, the detection zone 206 corresponds to a vertical projection on the ground of the tailgate when it is open.

In addition to the shadow zones that have just been mentioned, there is also a central shadow zone 211, that is not situated facing one of the sensors, but that results from the shape of the rear bumper: since the latter is dished, the sensors 202 and 203, operating in crossed detection mode, give rise to the central shadow zone 211.

A major problem then arises for automatic tailgate closure operations: when an automatic closure operation has to be performed, the dedicated sensors are intended to check the presence or not of an element, notably of an individual, within a determined detection zone. If no presence is detected, then the automatic closure of the tailgate is initiated. Now, if the individual is located in a shadow zone, his presence could not have been detected although he is present in the detection zone. The impact with the tailgate is then inevitable.

The subject of the invention proposes a solution to the problems that have just been mentioned. In the invention, means are proposed to avoid having the tailgate, during its automatic closure movement, come into collision with an obstacle, notably an individual, even when the latter is located in a shadow zone of the detection zone. To this end, it is proposed in the invention to observe a sequence of operations to check that no element is located in a shadow zone at the moment when the closure operation might begin. Thus, in the invention, the closure is conditioned by a first operation to detect an element in the detection zone, then by a second operation for departure of the element concerned from the detection zone by moving away from the vehicle. Thus, assuming an individual were located in a shadow zone at an instant when the automatic closure would be likely to be triggered, no closure operation is undertaken as long as the individual has not departed within a first time from the shadow zone, then, in a second time, from the detection zone.

The invention therefore relates mainly to a secure method of automatically closing a motor vehicle tailgate equipped with at least one sensor detecting the presence of an element in a detection zone, said detection zone having at least one shadow zone, characterized in that it comprises the step for conditioning the operation for automatically closing the tailgate of the vehicle on completion of the following various operations:
  detecting the presence of an element in the detection zone;
  detecting a departure of said element from the detection zone.

In addition, or instead of, the main characteristics that have just been mentioned in the preceding paragraph, the inventive method can offer one or more additional characteristics from the following:
  the method comprises the preliminary step of receiving a command to automatically close the trunk of the vehicle;
  the closure command is received by means of an intention sensor;
  the intention sensor is positioned in the trunk of the vehicle, on one of the lateral walls of said trunk;
  the presence sensors are sensors used for a parking aid function;
  the sensors involve at least one camera oriented towards the rear of the vehicle, said camera cooperating with image processing applications;
  the method comprises the additional various steps for:
  immediately the automatic command to automatically close the trunk of the vehicle is received, triggering a first countdown of a first duration;
  if no element presence has been detected in the detection zone after the first countdown, canceling the operation for automatically closing the vehicle tailgate;
  the first duration is between 15 and 25 seconds, notably 20 seconds;
  the method comprises the additional various steps for:
  immediately the presence of an element is detected in the detection zone, triggering a second countdown of a second duration;
  if no departure of said element from the detection zone has taken place by the end of the second countdown, canceling the operation to automatically close the vehicle tailgate;
  the second duration is between 4 and 10 seconds, notably 5 seconds;
  the method comprises the additional step of stopping the operation to automatically close the tailgate immediately a return of an element to the detection zone is detected;
  the method comprises the additional step of resuming the operation to automatically close the tailgate immediately a new detection of departure of said element from the detection zone is performed;
  the detection zone consists of two detection sub-zones;
  the second detection sub-zone has a width that makes it possible to reliably detect an element;
  the step for detection of the presence of an element in the detection zone comprises the substeps for:
  immediately the automatic command to automatically close the trunk of the vehicle is received, triggering a third countdown of a first duration;
  if no element presence has been detected in the first detection sub-zone on completion of the third countdown, canceling the operation to automatically close the vehicle tailgate;
  the step for detection of the presence of an element in the detection zone comprises the additional substeps for:
  immediately the presence of an element is detected in the first detection sub-zone, triggering a fourth countdown of a second duration;
  if no element presence has been detected in the second detection sub-zone on completion of the fourth countdown, canceling the operation to automatically close the vehicle tailgate;
  the step for detection of the presence of an element in the detection zone comprises the additional substeps for:
  immediately the presence of an element is detected in the second detection sub-zone, detecting the presence of the element in the first detection sub-zone;
  if no element presence has been detected in the first detection sub-zone, proceeding with the operation to automatically close the vehicle tailgate.

BRIEF DESCRIPTION OF THE DRAWINGS

The invention and its various applications will be better understood on reading the following description and studying the accompanying figures.

The latter are presented solely as an indication without in any way limiting the invention. The figures show.

DETAILED DESCRIPTION

Figure 3:
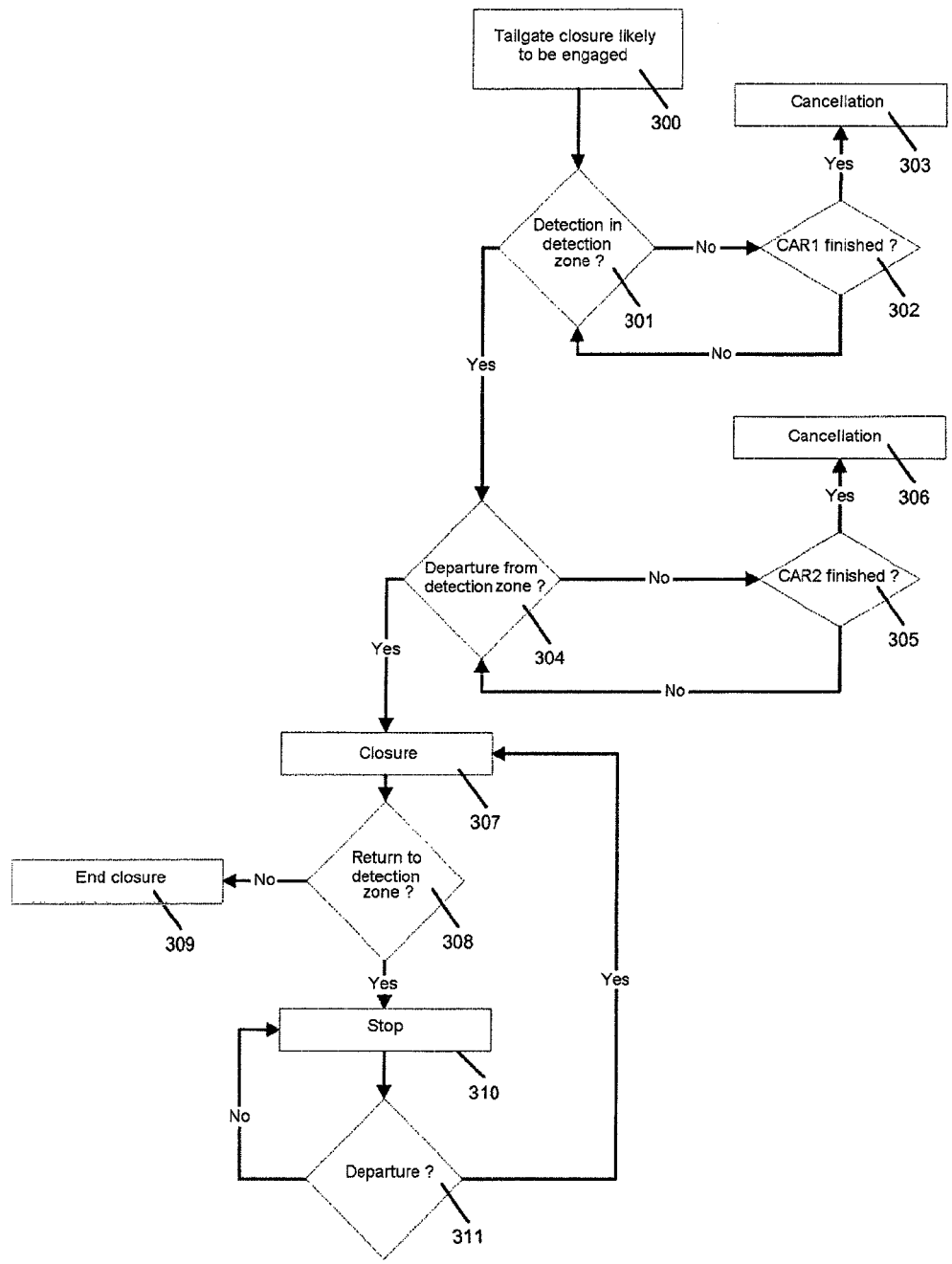
in FIG. 3, a flow diagram illustrating an exemplary implementation of the inventive method according to a first embodiment.

According to the first embodiment, a first step 300 of the flow diagram of FIG. 3 lies in the fact that an operation to automatically close the tailgate of the vehicle is likely to occur. The cases where such a closure is likely to occur vary: for example, the vehicle may have an electronic control unit configured to determine that if the tailgate is open for a certain time, then an automatic closure of this tailgate may be triggered, possibly subject to certain conditions being met. In another example, the closure is likely to occur following the reception of a closure command: such a closure command may, for example, be given by the user, notably via an intention sensor, that stores the will of the user to provoke the automatic closure of the tailgate; in such a case, the actual closure occurs after certain safety conditions for providing such a closure have been met.

Figure 1:
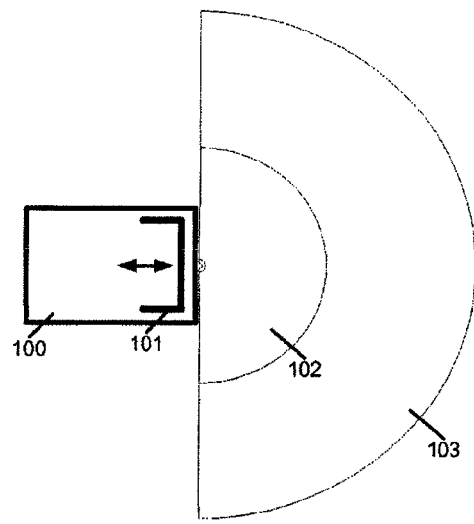
in FIG. 1, already described, a diagrammatic representation of a sensor used in a parking aid function illustrating the presence of a shadow zone.
Figure 2:
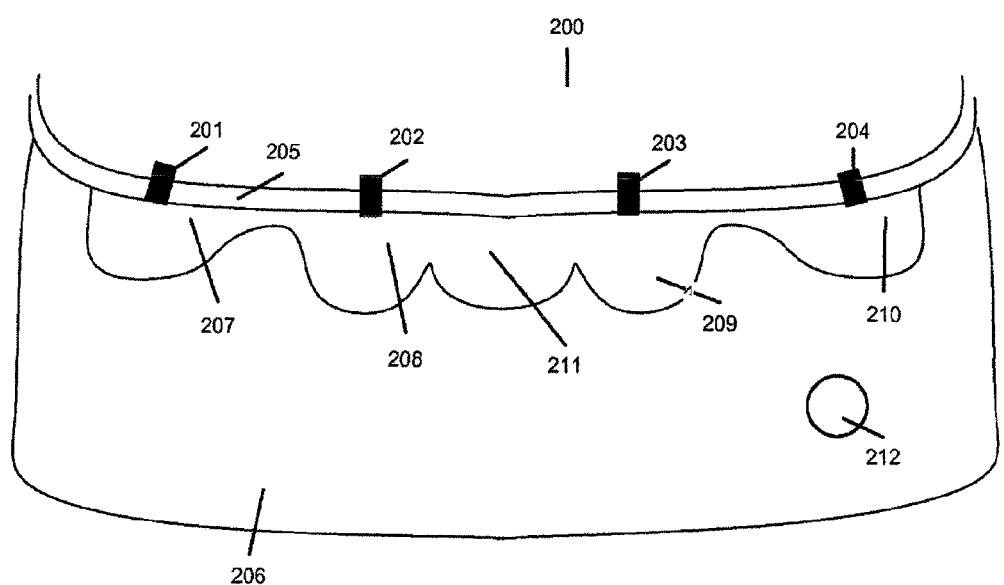
in FIG. 2, also already described, a diagrammatic representation, according to a first nonlimiting embodiment, of a detection zone defined at the back of a vehicle, showing the existence of shadow zones.

On completion of the step 300 there is a decision step 301 in which it is determined, by means of the sensors described previously, whether an element is located in the detection zone. In a nonlimiting embodiment, provision is made to position an automatic closure trigger, for example an intention sensor, inside the trunk, on one of the sides of the latter. Thus, the user has little chance of being located in a shadow zone because he has to be placed at the end, on the right for example, of the detection zone. Now, as can be seen in FIG. 2, such an end 212 does not constitute a shadow zone. The presence of the user will thus be immediately detected. In the negative case, that is to say if no element detection has taken place, the method goes onto a step 302, in which a first countdown is triggered. Until the countdown has reached its end, the system remains awaiting a detection in the detection zone. If the countdown reaches its end, in a nonlimiting example 20 seconds after the reception of a command relating to the automatic closure of the tailgate, then the system goes onto a step 303 in which the automatic closure operation is canceled.

Assuming that an element is detected in the detection zone, a decision step 304 takes place, in which it is determined, still by means of the sensors described, whether the detected element has departed from the detection zone. In a nonlimiting embodiment, it is determined that the element has left the detection zone if the sensors determine that the distance separating the element concerned from the rear of the vehicle is greater than a previously determined value, for example a meter. Thus, the return into a shadow zone of the element concerned is not considered as a departure from the detection zone. In other exemplary implementations, provision can be made to detect the departure, no longer from the detection zone, but from a secure detection zone that is wider than the detection zone as previously defined.

In the negative case, that is to say if it is not detected that the element concerned has departed from the detection zone, the system goes onto a step 305, in which a second countdown is triggered. Until the countdown has reached its end, the system remains awaiting a departure of the element concerned from the detection zone. If the countdown reaches its end, in a nonlimiting example 5 seconds after the element concerned has been detected in the detection zone, then the system goes onto a step 306 in which the automatic closure operation is canceled.

Assuming that the element concerned is detected as having departed from the detection zone, the system proceeds, in a step 307, with the automatic closure of the tailgate. However, there is then activated a decision step 308 to determine whether a return of an element to the detection zone occurs. If it does not, the closure operation is continued until its completion in a step 309. In the positive case, the system proceeds, in a step 310, to stop the automatic closure, as long as no new departure from the detection zone is recognized in a decision step 311. Immediately a new departure from the detection zone is recognized by the sensors, then the system proceeds to resume the automatic closure undertaken in the step 307.

In practice, the departure from the detection zone 206 is determined by a detection of the element in an external zone 213, which is located at the periphery of the detection zone 206 and which is defined by the actual detection coverage of the sensors 201 to 204 minus the detection zone 206, as illustrated in FIG. 2.

It will be noted that, on the rear sides of the vehicle, the detection coverage of the sensors is insufficient to ensure the detection of an element in this external zone 213. The automatic closure of the tailgate will not be performed even though the element has departed from the detection zone 206.

To this end, in order to resolve this problem, in a second nonlimiting embodiment, the detection zone 206 consists of two detection sub-zones 206a and 206b, in addition to the shadow zones described previously.

As will be seen hereinbelow, the step for detection of the presence of an element in the detection zone consists of two substeps in which the element is detected in the first sub-zone 206a, and in the second sub-zone 206b.

The second sub-zone 206b has a width that makes it possible to reliably detect an element. In a nonlimiting example, the width is 15 cm in order to ensure a rapid detection, in less than 150 ms, of an element moving at a speed of one meter per second.

Figure 5:
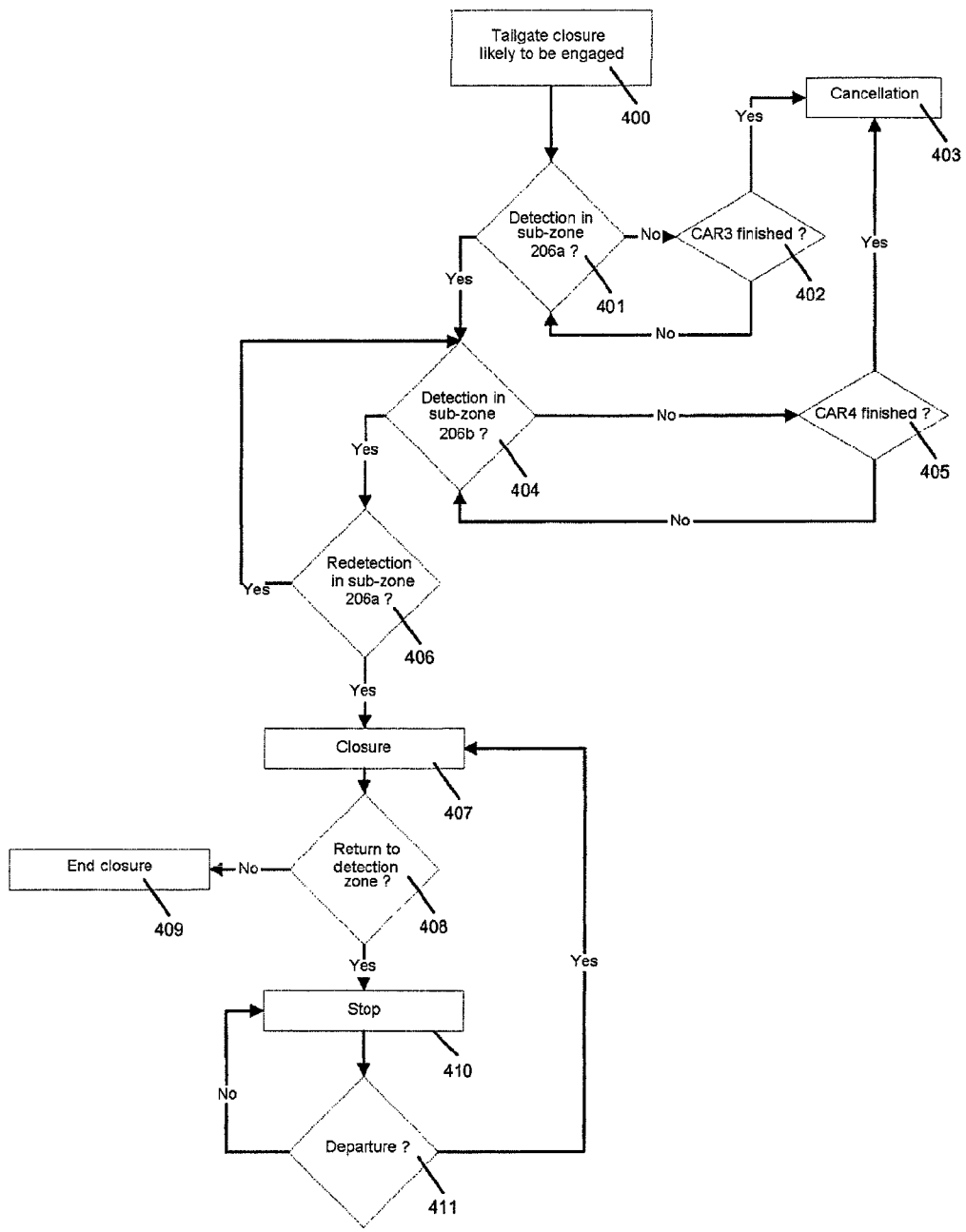

According to the second embodiment, a first step 400 of the flow diagram of FIG. 5 lies in the fact that an operation to automatically close the tailgate of the vehicle is likely to occur. The cases where such a closure is likely to occur vary, as explained in the first embodiment.

On completion of the step 400, there is a decision step 401 in which it is determined, by means of the sensors described previously, whether an element is located in the first detection sub-zone 206a.

Figure 4:
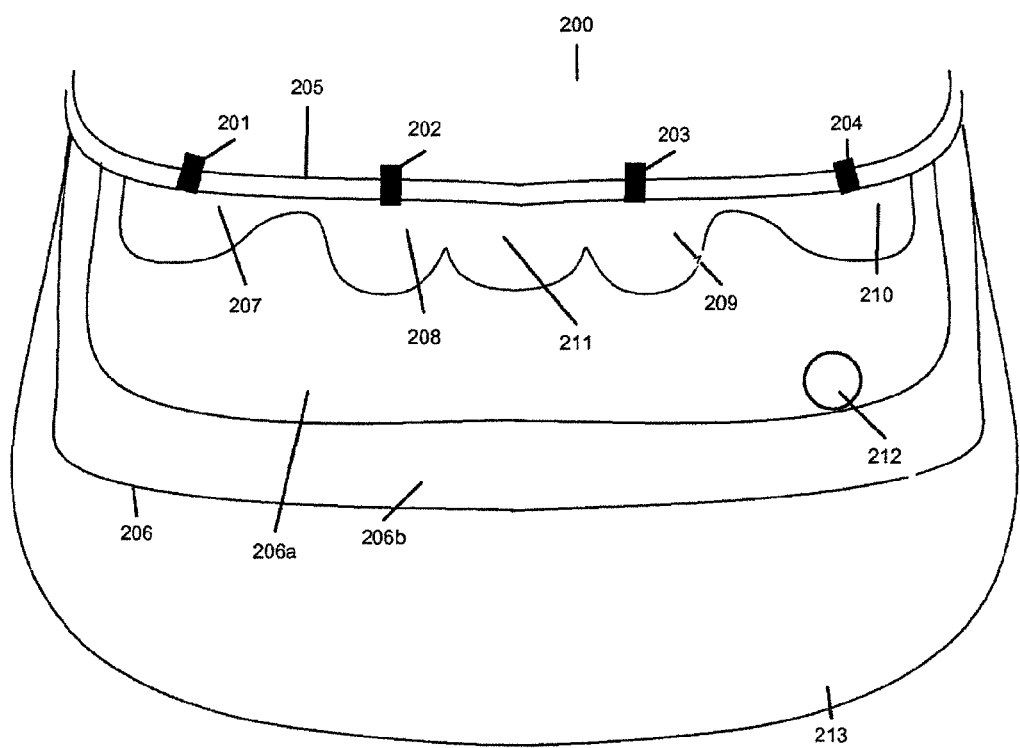
in FIG. 4, a diagrammatic representation, according to a second nonlimiting embodiment, of a detection zone defined at the back of a vehicle, showing the existence of shadow zones; and
  in FIG. 5, a flow diagram illustrating an exemplary implementation of the method according to the invention according to a second embodiment.

In a nonlimiting embodiment, provision is made to place an automatic closure trigger, for example an intention sensor, inside the trunk, on one of the sides of the latter. Thus, the user has little chance of being located in a shadow zone because he will have to be placed at the end, on the right, for example, of the detection zone. Now, as can be seen in FIG. 4, such an end 212 does not constitute a shadow zone. The presence of the user will thus be immediately detected.

In the negative case, that is to say if no element detection has occurred in this sub-zone 206a, the system goes onto a step 402 in which a third countdown CAR3 is triggered. Until the countdown CAR3 has reached its end, the system remains awaiting a detection in the detection sub-zone 206a. If the countdown CAR3 comes to its end, in a nonlimiting example 20 seconds after the reception of a command relating to the automatic closure of the tailgate, then the system goes onto a step 403 in which the automatic closure operation is canceled. In this case, this means that the element is in a shadow zone.

In the positive case where an element is detected in the first detection sub-zone 206a, a decision step 404 occurs, in which it is determined, still by means of the sensors described, whether the detected element has entered into the second detection sub-zone 206b.

If it has not, that is to say if it is not detected that the element concerned has entered into the second detection sub-zone 206b, the system goes onto a step 405, in which a fourth countdown CAR4 is triggered. Until the countdown CAR4 has reached its end, the system remains awaiting an entry of the element concerned into the second detection sub-zone 206b. If the countdown CAR4 reaches its end, in a nonlimiting example 5 seconds after the element concerned has been detected in the first detection sub-zone 206a, then the system goes onto the step 403 in which the automatic closure operation is canceled. In this case, this means that the element has either remained in the first detection sub-zone 206a, or that it has returned to a shadow zone.

Assuming that an element is detected in the second detection sub-zone 206b, a decision step 406 occurs, in which it is determined, still by means of the sensors described, whether the detected element has returned to the first detection sub-zone 206a.

Assuming that an element is detected in the first detection sub-zone 206a, the system returns to the preceding step 404.

In the negative case where an element is not detected in the first detection sub-zone 206a, then the system proceeds, in a step 407, with the automatic closure of the tailgate. In this case, the element concerned is detected as having departed from the detection zone 206. This means that either it is located in the external zone 213, or it is located outside the detection coverage of the sensors 201 to 204.

In other exemplary implementations, it is possible to provide for detecting the departure, no longer from the detection zone 206, but from a secure detection zone that is wider than the detection zone as previously defined.

However, there is then activated a decision step 408 to determine whether a return of an element to the detection zone 206 occurs. In the negative case, the closure operation is continued to its end in a step 409. In the positive case, the system proceeds, in a step 410, to stop the automatic closure, as long as no new departure from the detection zone is recognized in a decision step 411. Immediately a new departure from the detection zone 206 is recognized by the sensors, then the system proceeds to resume the automatic closure undertaken in the step 407.

Thus, thanks to this second embodiment, the automatic closure of the tailgate will be able to be performed correctly when the element departs from the detection zone 206 and is located outside the detection coverage of the sensors 201 to 204. In addition, as in the case of the first embodiment, when the element departs from the detection zone 206 and is located in the external zone 213, the closure of the tailgate is also correctly performed.

The invention claimed is:

1. A secure method of automatically closing a motor vehicle tailgate equipped with at least one sensor detecting the presence of an element in a detection zone, said detection zone having at least one shadow zone, the method comprising:
an operation for automatically closing the tailgate of the vehicle is conditioned upon:
detecting the presence of an element in the detection zone; and
detecting a departure of said element from the detection zone,
wherein the method further comprises a preliminary step of receiving a command to automatically close the trunk of the vehicle, and
wherein the method further comprises:
immediately after receiving the automatic command to automatically close the trunk of the vehicle, triggering a first countdown of a first duration; and
if no element presence is detected in the detection zone after the first countdown, canceling the operation for automatically closing the vehicle tailgate.

2. The method as claimed in claim 1, wherein the closure command is received from an intention sensor.

3. The method as claimed in claim 2, wherein the intention sensor is positioned in the trunk of the vehicle, on one of a plurality of lateral walls of said trunk.

4. The method as claimed in claim 1, wherein the at least one sensor detecting the presence of the element in the detection zone is a sensor used for a parking aid function.

5. The method as claimed in claim 1, wherein the at least one sensor detecting the presence of the element in the detection zone is involves at least one camera oriented towards the rear of the vehicle, said camera cooperating with image processing applications.

6. The method as claimed in claim 1, wherein the first duration is between 15 and 25 seconds.

7. The method as claimed in claim 1, further comprising:
immediately after detecting the presence of an element in the detection zone, triggering a second countdown of a second duration;
if no departure of said element from the detection zone has taken place by the end of the second countdown, canceling the operation to automatically close the vehicle tailgate.

8. The method as claimed in claim 7, wherein the second duration is between 4 and 10 seconds.

9. The method as claimed in claim 1, further comprising stopping the operation to automatically close the tailgate immediately a return of an element to the detection zone is detected.

10. The method as claimed in the claim 9, further comprising resuming the operation to automatically close the tailgate immediately a new detection of departure of said element from the detection zone is performed.

11. The method as claimed in claim 1, the detection zone consists of two detection sub-zones.

12. The method as claimed claim 11, wherein the second detection sub-zone has a width that makes it possible to reliably detect an element.

13. A secure method of automatically closing a motor vehicle tailgate equipped with at least one sensor detecting the presence of an element in a detection zone, said detection zone having at least one shadow zone, the method comprising:
an operation for automatically closing the tailgate of the vehicle is conditioned upon:
detecting the presence of an element in the detection zone; and
detecting a departure of said element from the detection zone,
wherein the detection zone consists of two detection sub-zones, and
wherein the detection of the presence of an element in the detection zone comprises:
immediately after the automatic command to automatically close the trunk of the vehicle is received, triggering a third countdown of a first duration;
if no element presence has been detected in the first detection sub-zone on completion of the third countdown, canceling the operation to automatically close the vehicle tailgate.

14. The method as claimed in claim 13, wherein the detection of the presence of an element in the detection zone comprises:
immediately after the presence of an element is detected in the first detection sub-zone, triggering a fourth countdown of a second duration;
if no element presence has been detected in the second detection sub-zone on completion of the fourth countdown, canceling the operation to automatically close the vehicle tailgate.

15. The method as claimed in claim 14, wherein the detection of the presence of an element in the detection zone comprises:

immediately after the presence of an element is detected in the second detection sub-zone, detecting the presence of the element in the first detection sub-zone;

if no element presence has been detected in the first detection sub-zone, proceeding with the operation to automatically close the vehicle tailgate.

* * * * *